United States Patent [19]

Juneau, Jr. et al.

[11] 4,145,328

[45] Mar. 20, 1979

[54] BIMETALLIC ADHESIVE MIXTURE FOR BONDING AND RELEASE APPLICATIONS

[75] Inventors: Paul W. Juneau, Jr., Norristown; Martin M. West, Philadelphia, both of Pa.

[73] Assignee: General Electric Company, Philadelphia, Pa.

[21] Appl. No.: 801,682

[22] Filed: May 31, 1977

Related U.S. Application Data

[63] Continuation-in-part of Ser. No. 581,874, May 29, 1975, abandoned.

[51] Int. Cl.$^2$ .......................... C08K 3/08; C08K 5/01; C08K 5/05; C08K 5/07
[52] U.S. Cl. .......................... 260/30.4 R; 260/29.1 R; 260/30.4 N; 260/32.8 EP; 260/32.8 N; 260/32.8 R; 260/33.4 EP; 260/33.4 F; 260/33.4 R; 260/33.6 EP; 260/33.6 F; 260/37 M; 260/42.22; 423/297; 423/298
[58] Field of Search .............................. 106/59, 73.3; 260/42.22, 37 M, 30.4 N, 33.4 R, 33.4 EP, 32.8 N, 32.8 EP, 30.4 R, 32.8 R, 33.6 R, 33.6 EP, 33.6 F, 33.4 F; 423/297, 298

[56] References Cited

U.S. PATENT DOCUMENTS

| | | | |
|---|---|---|---|
| 3,872,051 | 3/1975 | Tiedeman et al. | 260/37 M |
| 3,889,756 | 6/1975 | Dunn | 169/59 |

FOREIGN PATENT DOCUMENTS 763940  12/1956  United Kingdom ................. 260/37 M

*Primary Examiner*—Allan Lieberman
*Attorney, Agent, or Firm*—Stephen A. Young

[57] ABSTRACT

A bimetallic adhesive for surface bonding and for controlled release applications that is non-explosive and which also provides improved shock, moisture, temperature and spark resistance characteristics. The bimetallic adhesive comprises a resinous adhesive binder and a bimetallic mixture, which consists of boron and titanium powders. The bimetallic adhesive mixture provides a controlled release function to separate a bonded surface when heated to a temperature above 600° C., thereby causing the mixture to react exothermically to effect complete deflagration of the mixture.

11 Claims, No Drawings

BIMETALLIC ADHESIVE MIXTURE FOR BONDING AND RELEASE APPLICATIONS

This application is a continuation-in-part of our co-pending application, Ser. No. 581,874 filed May 29, 1975 now abandoned.

BACKGROUND OF THE INVENTION

1. Field of the Invention

The present invention is concerned with a bimetallic adhesive mixture for surface bonding, which when heated above 600° C., reacts exothermically to provide a controlled release function for separating the surface bonded joint.

2. Description of the Prior Art

Fire extinguishing materials contained under adhesive bonded covers in electric appliances, such as ranges, may be released under emergency conditions to extinguish fires caused by failure to turn off the ranges, or fires caused by cooking oils spilled on the ranges. Heat generated by these fires is utilized to release or separate the adhesive bonded covers and thereby free the fire extinguishing materials. Moreover, adhesive bonded automobile windshields and adhesive bonded emergency exit areas for vehicles, such as airplanes, may also be released by utilizing the heat generated from accidentally caused fires to separate the adhesive bonded windshields or exit areas. In this manner, emergency exits may be provided for occupants trapped inside these vehicles. Also, adhesive bonded jackets on space re-entry vehicles may also be released by utilizing the heat induced through atmospheric re-entry conditions.

However, present adhesives available for surface bonding are limited in ability to provide a bonded joint having a controlled release function, particularly a release function which separates a surface bonded joint and to withstand severe environmental conditions.

Severe environmental conditions generally associated with the normal use and operation of electrical appliances and vehicles often include critical factors such as: shock, vibration and long term storage effects, which include the effects of temperature and humidity. However, at present there is no adhesive used in the above type appliances and vehicles which can satisfy requirements for normal usage and emergency type applications by providing a controlled release function in non-explosive fashion while at the same time having adequate shock, moisture, temperature and spark resistance characteristics.

It is therefore an objective of this invention to provide a bimetallic adhesive mixture for surface bonding which has a controlled release function.

Another object of this invention is to provide a bimetallic adhesive mixture which has a controlled release function that does not require the presence of oxygen for its operation.

Still another object of this invention is to provide a bimetallic adhesive possessing shock resistance, temperature resistance, moisture resistance, and spark resistance characteristics, and which is also non-explosive.

Yet another object of this invention is to provide a bimetallic adhesive mixture which possesses flexibility in controlling the exothermic reaction characteristics for the release function.

SUMMARY OF THE INVENTION

A bimetallic adhesive for surface bonding comprising a mixture of titanium and boron powders in the ratio of one atom of titanium and two atoms of boron and which further includes a resinous adhesive binder. The resinous adhesive binder may consist of: epoxy resins, polyamide resins, polyvinyl resins, resorcinol resins, acrylic latexes, polyesters or a combination of these adhesives with or without polytetrafluoroethylene. The mixture of titanium and boron powders is employed in place of a filler material, and provides a controlled release function to separate a bonded joint. The mixture is triggered by heating the mixture at a reaction temperature above 600° C. The heat causes the mixture to exothermically react to effect complete deflagration of the mixture. Moreover, the adhesive is non-explosive and possesses excellent shock resistance, temperature resistance, moisture resistance, and spark resistance characteristics.

DESCRIPTION OF THE PREFERRED EMBODIMENTS OF INVENTION

A bimetallic adhesive according to a basic formulation of this invention contains, in addition to a resinous adhesive binder, a volatile solvent, and a mixture of powders comprised of boron and titanium in the ratio of two atoms of boron to one of titanium. The formulation is utilized for providing a surface to surface bond and for release mechanism for semi-permanent fastening applications. In this embodiment of the invention, the mixture of the bimetallic powders replaces a filler material generally used in adhesives. The mixture of bimetallic powders utilized in the invention consists of 4.8 parts by weight of titanium powder and 2.2 parts by weight of boron powder.

The adhesive mixture is principally characterized by the fact that it undergoes an exothermic reaction to release or separate a surface bonded joint through complete deflagration of the mixture. The exothermic reaction is triggered by heating the mixture with either an electric current in a conventional hot wire bridge circuit embedded in the mixture, or by exposing the mixture to externally applied heat including direct flames until a reaction temperature of about 600° C. is reached. The exothermic reaction will take place without the support of oxygen and therefore will release a bonded joint in a vacuum as well as air.

The mixture also possesses flexibility in controlling the reaction characteristics. Reaction rates and ignition times can be varied by changing the composition of the mixture. This means that a controlled release function for separating bonded joints can be obtained, and that the mixture has great versatility as it can be tailored to meet specific requirements for a wide range of surface to surface bonding applications. In addition to the above, the mixture is non-explosive and possesses the following important characteristics:

1. Shock resistance.

Through improved resistance to shock, important bonding applications where shock properties are critical are now possible since the exothermic reaction cannot be initiated by sudden impact, for example, by dropping or by externally applied dynamic shock.

2. Temperature resistance.

The mixture cannot be initiated by moderate temperatures. Accordingly, the mixture can be stored and operated at temperatures above those of conventional explosives.

3. Moisture resistance.

The mixture will not degrade under the influence of high humidity or moisture. Accordingly, it is possible to obtain bonded surfaces having a controlled release function in underwater applications which were previously too difficult or impossible to obtain.

4. Spark resistance.

Even though the mixture can be initiated by a sizable electrical discharge, the mixture's spark resistance characteristics will enable surface bonding applications that will not be affected by the magnitude of electrical energy from RF signals or static discharge by operator handling.

A polytetrafluoroethylene (PTFE) polyvinyl butyral composite adhesive, according to an alternative formulation of the invention, incorporates powdered PTFE to the extent of 30% in a resinous adhesive. This alternative formulation, when triggered, generates a gas providing a more efficient bond release. For example, heat generated by the exothermic reaction of the bimetallic mixture causes the polymer to decompose and assist in breaking the adhesive bond. This occurs when the polymer depolymerizes to form a gas $C_2F_4$, which reacts with the titanium powders and boron metals to form fluorides and carbides. A similar reaction occurs when PTFE is incorporated with adhesive binders other than the ones above mentioned.

The invention is illustrated with reference to the following compositions which are not intended to be limitative.

| Composition 1 Polyamide epoxy composites | |
|---|---|
| Ingredients | % Parts by Weight (±0.1%) |
| Epon 815 (a) | 17.5% |
| Pentamid 840 (b) | 7.5% |
| Acetone | 25.0% |
| Titanium | 34.3% |
| Boron | 15.7% |

(a) Epon 815 is the trademark of Shell Chemical Company for a phenylglycidyl ether modified diglycidyl ether of bisphenol A, having an epoxy equivalent in the range of 160–220 and having a viscosity of 2000 centipoises. The phenylglycidyl ether can be present to the extent of 15% to 30% by weight.
(b) Pentamid 840 is the trademark of Ciba-Geigy Corporation for a polyamide which is the reaction product of a dimerized fatty acid and an excess of ethylene diamine, so that amino end groups are available for reaction. A viscosity of 3000–5000 cps at 25° C is typical.

(a) Epon 815 is the trademark of Shell Chemical Company for a phenylglycidyl ether modified diglycidyl ether of bisphenol A, having an epoxy equivalent in the range of 160–220 and having a viscosity of 2000 centipoises. The phenylglycidyl ether can be present to the extent of 15% to 30% by weight.

(b) Pentamid 840 is the trademark of Ciba-Geigy Corporation for a polyamide which is the reaction product of a dimerized fatty acid and an excess of ethylene diamine, so that amino end groups are available for reaction. A viscosity of 3000–5000 cps at 25° C. is typical.

| Composition 2 | |
|---|---|
| Ingredients | % Parts by Weight (±0.1%) |
| Formvar 15/95E (c) | 4.46% |
| Dioxane | 53.5% |
| Toluene | 35.71% |
| Titanium | 4.28% |
| Boron | 1.96% |

(c) Formvar 15/95E is a trademark of Monsanto Company for polyvinyl formal consisting of 95% cyclic structures and 5% hydroxyl groups.

| Composition 3 | |
|---|---|
| Ingredients | % Parts by Weight (±0.1%) |
| Polyvinyl butyral | 4.59% |
| Methanol | 87.24% |
| Titanium | 4.41% |
| Boron | 2.02% |
| PTFE (polytetrafluoroethylene) | 1.74% |

All three formulations are mixed mechanically in a conventional manner to produce a smooth even blend, with all solid material having particle sizes ranging from two microns to 30 microns. The metals in powder form are mixed by tumbling together in the dry state to ensure thorough mixing in all formulations. Other additives such as powdered PTFE (up to 30 percent) may be included at this state of mixing. Then a dilute dispersion (5–10 percent solids) of the resin is added, and the mixture is stirred with a low shear mixer or a spatula until thoroughly mixed. It should be noted that varying the amount of solvent has no effect on the properties of the cured material, since the solvent evaporates and is not present during the operation of the composition as an adhesive bond. The final composition may consist of 30%–50% resinous binder, with the rest of the composition being the mixture(s) of boron, titanium and PTFE powders.

While epoxy resins, polyamide resins and polyvinyl resins have been used in the above formulations as resinous/adhesive binders other resins can also be used as resinous/adhesive binders of which the following is a partial list: (a) phenolic resins, in particular heat reactant types, (b) resorcinol resins, (c) polyesters, (d) acrylic latexes and (e) combinations of the above.

In Composition 1, the formulation as stated may be varied by changing resin content and solvent.

The preceding specific embodiments are illustrative of the practice of the invention. It is to be understood, however, that other ingredients known to those skilled in the art, or not disclosed herein may be employed without departing from the spirit of the invention or the scope of the appended claims.

What is claimed as new and desired to be secured by Letters Patent of the United States is:

1. A bimetallic adhesive for providing a surface to surface bond for fastening, which comprises:
   (a) a mixture of boron and titanium powders in the ratio of one atom of titanium to two atoms of boron,
   (b) a resinous adhesive binder in a solvent for said mixture said binder in sufficient quantity to comprise 30% to 50% by weight of the bimetallic adhesive after evaporation of the solvent, and
   (c) wherein said boron and titanium powders have particle sizes ranging from two microns to thirty microns.

2. A bimetallic adhesive as recited in claim 1, wherein the resinous adhesive binder is selected from the group consisting of epoxy resins, polyamide resins, polyvinyl resins, phenolic resins, resorcinol resins, polyester resins, acrylic latex resins, and combinations of said resins.

3. A bimetallic adhesive as recited in claim 2, wherein said mixture of said bimetallic materials react exothermically in the absence of oxygen to completely deflagrate said mixture of said bimetallic materials and adhesive binder creating said surface to surface bond when heated to a temperature of about 600° C., to thereby provide a controlled release function.

4. A bimetallic adhesive as recited in claim 3, wherein said bimetallic adhesive includes a bimetallic mixture of 2.2 parts by weight of boron and 4.8 parts by weight of titanium powders.

5. A bimetallic adhesive as recited in claim 4, including 30% of powdered polytetrafluorethylene, wherein heat generated by said exothermic reaction of said mixture of said bimetallic materials causes said resinous adhesive binder to decompose and assists in breaking any resinous adhesive bond present by reacting with said titanium powders and boron, wherein a controlled release is effected.

6. A bimetallic adhesive as recited in claim 4, wherein said resinous adhesive binder comprises:
   (a) 175 parts by weight of phenylglycidyl ether modified bisphenol A type epoxy having a viscosity of 2000 centipoises; and
   (b) 75 parts by weight of an amino terminated polyamide resinous material; and
   (c) 25 parts by weight of a solvent.

7. A bimetallic adhesive as recited in claim 4, wherein said resinous adhesive binder comprises:
   (a) 446 parts by weight of a polyvinyl formal;
   (b) 5357 parts by weight of dioxane; and
   (c) 3571 parts by weight of an aromatic or aliphatic hydrocarbon solvent.

8. A bimetallic adhesive as recited in claim 4, wherein said resinous adhesive binder comprises:
   (a) 459 parts by weight of a resinous/adhesive binder selected from the group consisting of polyvinyl butyrals, and polyvinyl formals;
   (b) 8724 parts by weight of acetone; and
   (c) 174 parts by weight of polytetrafluoroethylene (PTFE).

9. A bimetallic adhesive as recited in claim 6, wherein the solvent is acetone.

10. A bimetallic adhesive as recited in claim 7, wherein said aromatic hydrocarbon is toluene.

11. A bimetallic adhesive as recited in claim 8, wherein acetone is replaced by methanol.

* * * * *